(12) United States Patent  
Isobe

(10) Patent No.: US 9,900,520 B2
(45) Date of Patent: Feb. 20, 2018

(54) IMAGE PICKUP APPARATUS HAVING A CLIP LIMITING FEATURE TO AVOID IMAGE SMEAR

(71) Applicant: CANON KABUSHIKI KAISHA, Tokyo (JP)

(72) Inventor: Shingo Isobe, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/202,847

(22) Filed: Jul. 6, 2016

(65) Prior Publication Data

US 2017/0019609 A1  Jan. 19, 2017

(30) Foreign Application Priority Data

Jul. 15, 2015  (JP) ................. 2015-141305

(51) Int. Cl.
  H04N 5/235  (2006.01)
  H04N 5/232  (2006.01)
  H04N 5/3745  (2011.01)
  H04N 5/359  (2011.01)
  H04N 5/243  (2006.01)
  (Continued)

(52) U.S. Cl.
  CPC ....... *H04N 5/2352* (2013.01); *H04N 5/23229* (2013.01); *H04N 5/243* (2013.01); *H04N 5/359* (2013.01); *H04N 5/378* (2013.01); *H04N 5/37457* (2013.01); *H04N 5/2351* (2013.01); *H04N 5/355* (2013.01); *H04N 5/3595* (2013.01); *H04N 5/3745* (2013.01)

(58) Field of Classification Search
  None
  See application file for complete search history.

(56) References Cited

U.S. PATENT DOCUMENTS

| 8,928,786 B2 | 1/2015 | Iwata et al. | |
| 2005/0194520 A1* | 9/2005 | Koseki | H04N 3/155 250/214 AG |

(Continued)

FOREIGN PATENT DOCUMENTS

| JP | 2010093389 A | 4/2010 |
| JP | 2013085110 A | 5/2013 |
| JP | 2014165676 A | 9/2014 |

*Primary Examiner* — Justin P Misleh
(74) *Attorney, Agent, or Firm* — Rossi, Kimms & McDowell LLP

(57) ABSTRACT

An image pickup apparatus configured to output an image signal based on an optical signal photoelectrically converted by an image pickup element provided with two-dimensionally arranged pixels includes: a clipper configured to limit output voltage of the image signal based on the optical signal; a gain upper limit setter configured to set a gain upper limit to be applied to the optical signal; a determiner configured to determine whether or not a condition to cause occurrence of a smear in a shot image is satisfied; and a controller configured to limit an output voltage of the optical signal by using the clipper when the determiner determines that the condition to cause occurrence of the smear is satisfied, and to inactivate limitation of the output voltage of the optical signal by using the clipper when the determiner determines that the condition to cause occurrence of the smear is not satisfied.

9 Claims, 9 Drawing Sheets

(51) Int. Cl.
*H04N 5/378* (2011.01)
*H04N 5/355* (2011.01)

(56) References Cited

U.S. PATENT DOCUMENTS

| | | | | |
|---|---|---|---|---|
| 2007/0165117 A1* | 7/2007 | Toya | H04N 5/3598 | 348/241 |
| 2010/0039543 A1* | 2/2010 | Muroshima | H04N 5/3598 | 348/300 |
| 2010/0053396 A1* | 3/2010 | Okita | H04N 5/3595 | 348/301 |
| 2010/0188539 A1* | 7/2010 | Kobayashi | H04N 5/335 | 348/300 |
| 2010/0309356 A1* | 12/2010 | Ihara | H04N 5/3658 | 348/300 |
| 2011/0292264 A1* | 12/2011 | Kubo | H04N 5/3598 | 348/301 |

\* cited by examiner

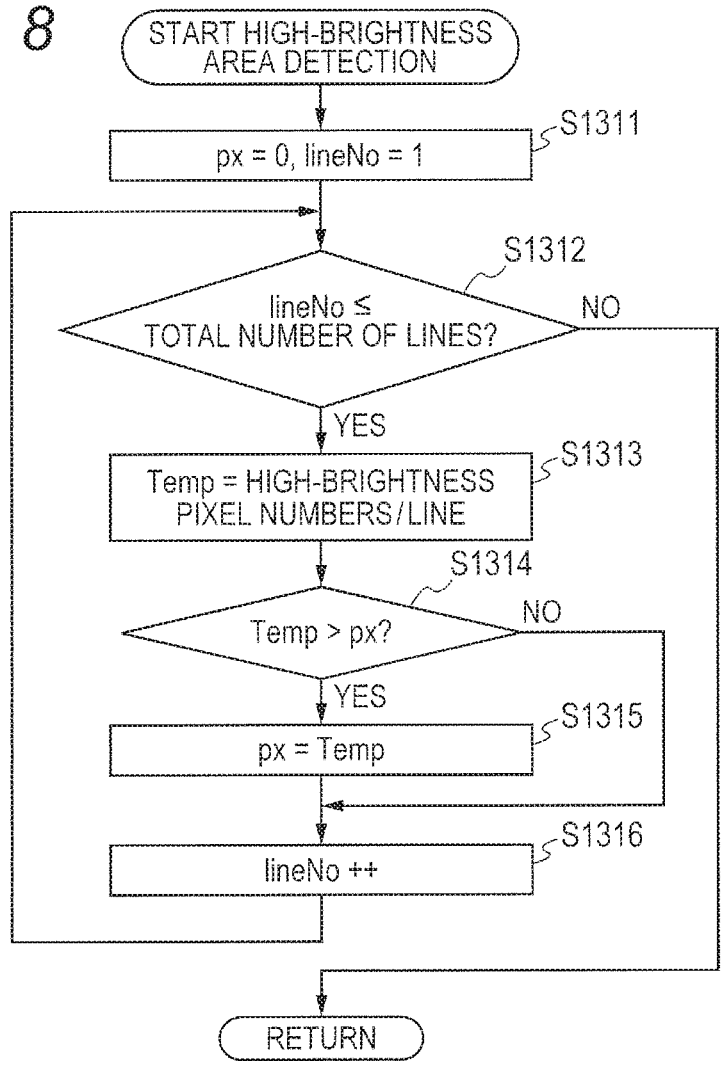
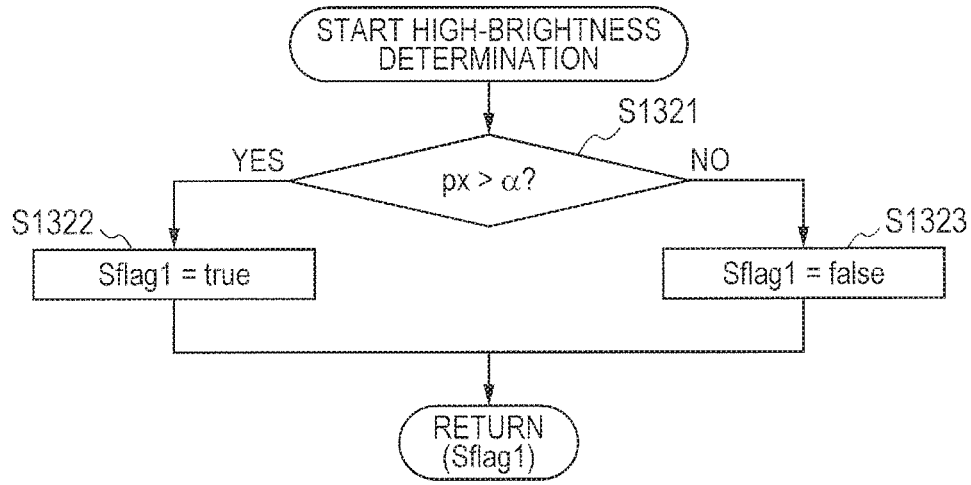

IMAGE PICKUP APPARATUS HAVING A CLIP LIMITING FEATURE TO AVOID IMAGE SMEAR

BACKGROUND OF THE INVENTION

Field of the Invention

The present invention relates to an image pickup apparatus, or more specifically, to an image pickup apparatus which implements countermeasures for smear phenomena of the image pickup apparatus, and realizes an increase in sensitivity of the image pickup apparatus.

Description of the Related Art

Solid-state image pickup elements have heretofore been used in image pickup apparatuses, and CCD sensors and CMOS sensors have been widely used as such solid-state image pickup elements. There has been known a smear phenomenon, in which a bright stripe noise appears in a column direction (a vertical direction) of the image pickup elements in the case of using the CCD sensors. When there is a high-brightness photographic subject on a picture plane, for example, the smear phenomenon in the CCD sensors occurs due to a situation where undesired charges are accumulated in the image pickup elements by way of exposure during vertical transfer and are mixed into signal charges being transferred on a vertical transfer path. Since such smear is attributed to the structural problem of the CCDs, the case of using the CMOS sensors does not cause the smear in the column direction in shooting a high-brightness photographic subject. The latter case, however, may cause a lateral smear phenomenon in which a level variation appears in the form of a horizontal line or a horizontal band in a row direction (a lateral direction) in a region where a high-brightness photographic subject is present.

Such a smear phenomenon in the CMOS sensors is thought to be attributed to wiring layouts for an electric source, ground, and so forth. When the high-brightness photographic subject forms an image at a particular portion on the picture plane, a large amount of charges are generated in such a high-brightness photographic subject region. In this case, outputs from a pixel unit, a vertical output line, a column amplifier unit, and the like may vary significantly and cause a variation in an electric source shared by the components on the same row. As a consequence, the level variation occurs across the same row, or in other words, the lateral smear phenomenon comes into being.

According to Japanese Patent Application Laid-Open Nos. 2010-093389 and 2014-165676, an output signal of an effective pixel part of an image pickup element is corrected on the basis of an output signal of a light shielding pixel part provided in a region outside of the effective pixel part. These publications state that it is thus possible to reduce smear phenomena that occur in image pickup apparatuses adopting the CCD sensors and the CMOS sensors.

According to Japanese Patent Application Laid-Open No. 2013-085110, in an electric source line for a sensor column circuit, a gate voltage of a current source transistor operating in a saturation region relative to an electric source voltage is sampled and stored. By controlling such that the gate voltage becomes equal to the sampled voltage, the variation in electric source voltage is suppressed and the smear phenomenon is suppressed as a consequence.

The above-described conventional techniques have a difficulty in dealing with various shooting scenes at day and night. For example, according to Japanese Patent Application Laid-Open Nos. 2010-093389 and 2014-165676, there may be a case where the effect to suppress the smear phenomenon can be somewhat produced but is still insufficient for full correction, which is likely to cause deterioration in image quality.

While the technique according to Japanese Patent Application Laid-Open No. 2013-085110 can curb the smear phenomenon by suppressing the variation in electric source voltage, each image pickup element is saturated with a smaller number of electrons than the saturation number of electrons intrinsic to the image pickup element. In other words, this technique has a problem of reduction in dynamic range of image pickup signals obtained.

Meanwhile, when a gain is increased for shooting at night in order to increase sensitivity, there is a risk of amplifying a smear component that fails to be properly corrected, thereby causing further deterioration in image quality and bringing about an ugly shot image. In this regard, it is a general practice to set a gain upper limit in advance.

SUMMARY OF THE INVENTION

Accordingly, an object of the present invention is to provide an image pickup apparatus including solid-state image pickup elements, which is capable of reducing the above-described smear phenomena under various shooting conditions and of achieving a wider dynamic range and high-sensitivity shooting in a low-illuminance shooting environment.

An image pickup apparatus of the present invention is the image pickup apparatus that outputs an image signal based on an optical signal photoelectrically converted by multiple two-dimensionally arranged pixels includes: a clipper that limits an output voltage of the image signal based on the optical signal; a gain upper limit setter that sets a gain upper limit to be applied to the optical signal; a determiner that determines whether or not there is a condition to cause occurrence of a smear in a shot image; and a controller configured to limit the output voltage of the image signal by using the clipper when the determiner determines that there is the condition to cause occurrence of the smear, and to inactivate limitation of the output voltage of the image signal by using the clipper when the determiner determines that there is not the condition to cause occurrence of the smear.

According to the present invention, it is possible to provide an image pickup apparatus which is capable of reducing a smear phenomenon when shooting a high-brightness photographic subject at low illuminance, and of expanding a dynamic range and increasing sensitivity at the time of low-illuminance shooting.

Further features of the present invention will become apparent from the following description of exemplary embodiments with reference to the attached drawings.

BRIEF DESCRIPTION OF THE DRAWINGS

FIG. 8 is a subroutine in step S131 of the first embodiment.

FIG. 9 is a subroutine in step S132 of the first embodiment.

DESCRIPTION OF THE EMBODIMENTS

Figure 1:
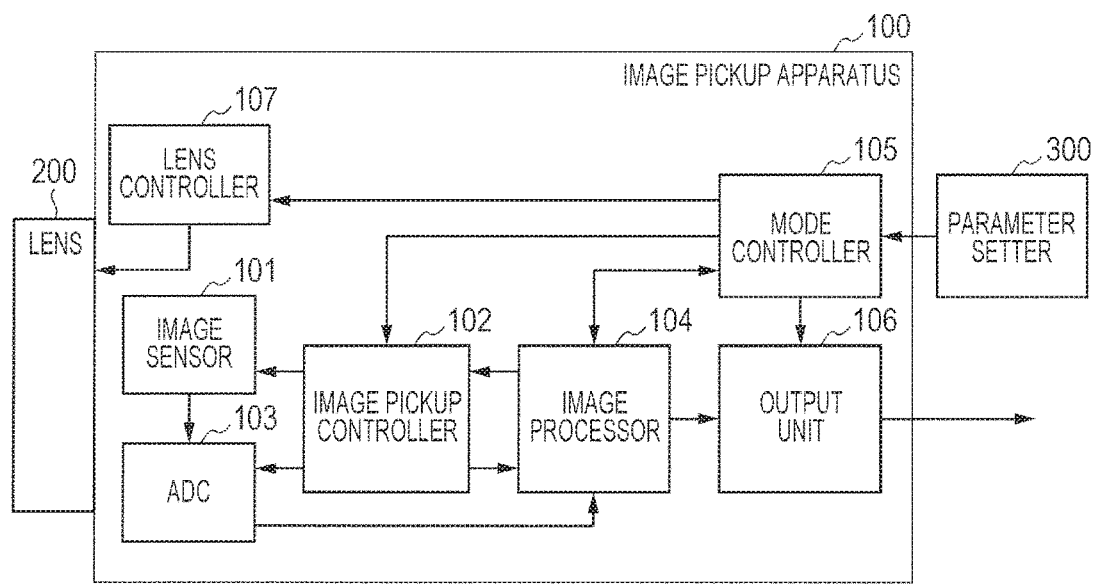
FIG. 1 is a configuration diagram of a first embodiment.

Preferred embodiments of the present invention will now be described below in detail based on the accompanying drawings. FIG. 1 is a configuration diagram concerning an embodiment of the present invention.

First Embodiment

FIG. 1 shows a configuration diagram of an image pickup apparatus of a first embodiment according to the present invention. An image pickup apparatus 100 includes an image pickup system provided with an image sensor (image pickup elements) 101, and performs image pickup processing by using an image pickup controller 102 and an ADC 103.

A lens 200 is located outside the image pickup apparatus 100. A light flux passing through the lens 200 is focused on the image sensor 101 of the image pickup apparatus 100. The lens 200 is detachably attached to the image pickup apparatus 100, and includes elements such as a stop mechanism, a variable magnification lens group, and a focusing lens group, which are not illustrated. Here, a focal length of the variable magnification lens group used in the lens 200 may be variable or fixed.

The image pickup controller 102 controls accumulation processing and read out processing of the image sensor 101. The image pickup controller 102 includes a timing generator for driving the image sensor 101 and the ADC 103. An image pickup signal is outputted from the image sensor 101 when the image sensor 101 is subjected to image pickup control. The ADC 103 performs AD conversion of the image pickup signal synchronously with the read out processing of the image sensor 101. Meanwhile, the image pickup controller 102 generates and outputs synchronization signals such as a frame synchronization signal, a vertical synchronization signal, and a horizontal synchronization signal, and furthermore, inputs to the image sensor 101 a clip voltage Vclip1 and a clip enable signal ENclip1 which will be described later.

An image processor 104 is provided behind the image pickup controller 102 and the ADC 103. The above-mentioned synchronization signals generated by the image pickup controller 102 and the image pickup signal subjected to the AD conversion by the ADC 103 are inputted to the image processor 104. In addition to publicly known correction processing for the inputted image pickup signal, the image processor 104 performs development processing, exposure control, detection processing of a smear region according to the present invention, digital gain processing, and so forth. While details of the detection processing of the smear region will be described later, the clip voltage Vclip1 and the clip enable signal ENclip1 to be provided to the image sensor 101 through the image pickup controller 102 are controlled by the detection of the smear region.

An output signal (an image signal) from the image processor 104 is outputted to the outside of the image pickup apparatus 100 through an output unit 106. The output unit 106 converts the output signal into a video signal such as an HDMI (registered trademark) signal and an HD-SDI signal.

A parameter setter 300 inputs signals from the outside of the image pickup apparatus 100 in order to select various parameters applicable to the image pickup apparatus 100. For instance, buttons, switches, and the like are used as examples of the parameter setter 300. Here, a mode may be set by using a CCU (communication control unit) or a remote control, or may be set by displaying a GUI on an external monitor. Alternatively, the mode may be set from a PC and the like.

The input signals from the parameter setter 300 are inputted to a mode controller 105. The mode controller 105 controls operations of the image pickup controller 102, the image processor 104, the output unit 106, a lens controller 107, and the like depending on the parameters selected by the parameter setter 300. The mode controller 105 performs restriction of a digital gain settable by the image processor 104, instructions of the clip voltage and the clip enable signal to the image pickup controller 102, and the like based on presence or absence of the smear region, a smear amount, and the like detected by the image processor 104.

The lens controller 107 communicates with the lens 200 through a not-illustrated communicator, and controls the lens 200 while receiving the instructions from the mode controller 105. The lens controller 107 performs drive control of the stop mechanism, the variable magnification lens group, the focusing lens group, and the like mentioned above which are included in the lens 200. Regarding the above-mentioned exposure control processing, for example, the lens controller 107 controls the stop mechanism in the lens 200.

Figure 2:
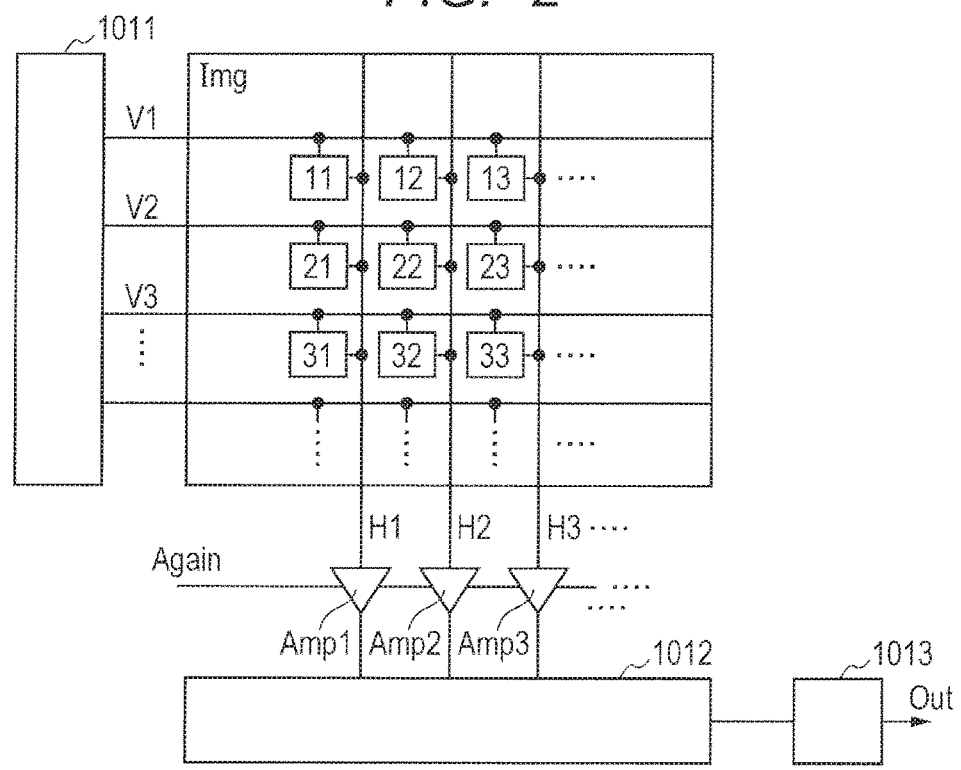
FIG. 2 is a first structural drawing of an image sensor of the first embodiment.

FIG. 2 shows a structural drawing of the image sensor 101. Reference code Img in FIG. 2 denotes an image pickup element group formed from multiple pixels that are two-dimensionally arranged. Reference numerals 11 to 33 in FIG. 2 represent part of a pixel array included in the image pickup element group Img. The respective pixels in the image pickup element group Img are connected to a vertical circuit 1011 and a horizontal circuit 1012 through horizontal signal lines V1, V2, V3, . . . and vertical signal lines H1, H2, H3, . . . . Column amplifiers Amp1, Amp2, Amp3, . . . are connected to the respective vertical signal lines, and are configured to amplify image pickup signals (optical signals) generated by photoelectrical conversion at the respective pixels. A column amplifier select line AgainSel is connected to the respective column amplifiers so that scale factors configured in the respective column amplifiers can be selected from the circuitry perspective. Examples of selectable scale factors include onefold, twofold, fourfold, eightfold, sixteenfold, and so forth. However, any arbitrary scale factor is applicable since the scale factors of the column amplifier circuits thus configured vary depending on the image sensors. In the meantime, a column amplifier voltage Vamp is provided as an electric source for the column amplifiers Amp to be described later. The column amplifier voltage Vamp is connected to the respective column amplifiers in common.

Not-illustrated control lines for reset pulse, selected line shift, and the like are connected to the vertical circuit 1011 in FIG. 2. These control lines are connected to the image pickup controller 102 in FIG. 1, and are designed to propagate the above-mentioned timing signals for controlling the drive of the image sensor 101. Meanwhile, two control lines for transfer pulse and read out pulse to be described later are connected to the horizontal circuit 1012 in FIG. 2. As with the control lines described above in connection with the vertical circuit 1011, these control lines are connected to the image pickup controller 102 in FIG. 1.

Figure 3:
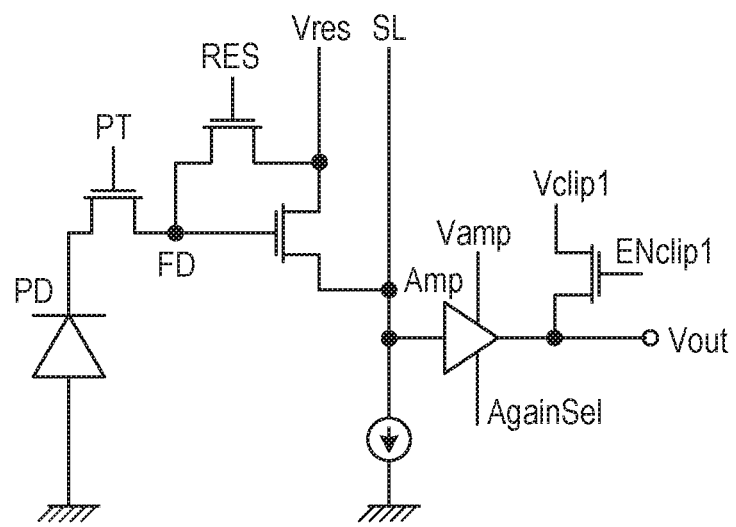
FIG. 3 is a second structural drawing of the image sensor of the first embodiment.

FIG. 3 shows a diagram depicting details of each image pickup element provided to the image sensor 101. Each pixel in the image sensor 101 is formed from a photoelectric converter PD which converts light into a charge signal and accumulates the charge signal. A reset voltage Vres is connected to a reset switch RES. When the reset switch RES is turned ON, an electric potential of a floating diffusion (hereinafter referred to as an FD) being a region indicated with code FD inside a circuit in FIG. 3 is reset to the reset voltage Vres. Note that the FD has a prescribed capacity and is capable of accumulating the charge signal.

When the reset switch RES is changed from ON-state to OFF-state in FIG. 3, the charges constituting an N signal are stored in the FD. A vertical signal line SL shown in FIG. 3 corresponds to any one of the vertical signal lines H1, H2, and H3 described with reference to FIG. 2. In the image sensor 101 of the present invention, the charges in the FD as the N signal are outputted to the vertical signal line SL after the resetting by the reset switch RES. At this time, if ordinary light from a photographic subject is incident on the image sensor 101, the light is acquired as a noise level of the image pickup signal.

When a forwarding switch PT in FIG. 3 is turned ON, the charge signal accumulated in the photoelectric converter PD is forwarded to the FD. Here, a period from a point to turn the reset switch RES from the ON-state to the OFF-state to a point to turn ON the forwarding switch PT corresponds to an accumulation period for the photoelectric converter PD, and the charge signal is increased or decreased depending on the accumulation period. The forwarded charge signal is then outputted to the vertical signal line SL.

The charge signal forwarded to the vertical signal line SL in FIG. 3 is amplified by the corresponding column amplifier Amp as described with reference to FIG. 2, and the amplified signal is outputted as a voltage value from an output terminal Vout. The column amplifier voltage Vamp is provided to the column amplifier Amp as an electric source. Meanwhile, the column amplifier select line AgainSel is connected to the column amplifier so that an amplification scale factor can be selected.

In the case of ordinary shooting, i.e., shooting in a situation that an amount of light incident on the image sensor 101 falls in a predetermined range, the image pickup signal to be amplified by the column amplifier Amp is outputted at a voltage which is substantially lower than the column amplifier voltage Vamp. However, when extremely high-brightness light is made incident on the photoelectric converter PD, the voltage level of the signal amplified by the column amplifier Amp may reach an almost equal level to the column amplifier voltage Vamp. For this reason, a value of a current flowing into the column amplifier Amp (current consumption by the column amplifier) is reduced in the case of high brightness. When the current consumption by the column amplifier is reduced, the voltages at all the column amplifiers Amp are increased (reduction of the voltages is suppressed) since the column amplifier voltage Vamp is connected to the respective column amplifiers as described with reference to FIG. 2. As a consequence, a variation in output occurs in every column amplifier Amp. This phenomenon has an adverse effect in the row direction since the column amplifier voltage Vamp is shared by the column amplifiers Amp, and hence causes an offsetting or gaining potential floated state in the horizontal direction around such a high-brightness area.

The clip voltage Vclip1 and the clip enable signal ENclip1 are connected to an output stage of the column amplifier Amp in FIG. 3. While the clip enable signal ENclip1 is turned ON, the upper limit of the voltage outputted from the column amplifier Amp is limited to the value of the clip voltage Vclip1. By setting the clip voltage Vclip1 lower than the voltage Vamp, the output voltage from the output terminal Vout can be set equal to or smaller than the predetermined value even in a case of high brightness. Thus, it is possible to suppress the variations in output of the column amplifiers Amp, and to reduce the smear phenomenon.

Meanwhile, as the clip voltage Vclip1 in FIG. 3 is set lower, a smaller amount of light from the output terminal Vout causes saturation. In other words, the dynamic range is reduced.

This embodiment shows an example of reducing the smear phenomenon as described above while increasing the dynamic range in a shooting scene in which the smear phenomenon is unlikely to occur.

Based on shooting scenes illustrated in FIGS. 4A to 4D as examples, a description will be given of an example of setting a shooting mode to reduce the smear phenomenon under a condition where the high-brightness photographic subject is present while switching to another shooting mode to give priority to the dynamic range under a condition where the high-brightness photographic subject is absent.

Figure 4A:
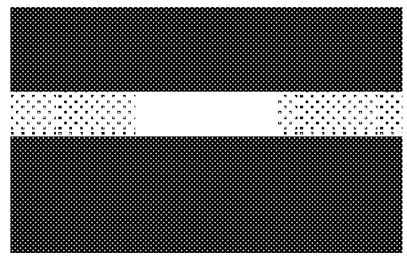
FIGS. 4A, 4B, 4C and 4D illustrate images shot in the first embodiment.
Figure 4B:
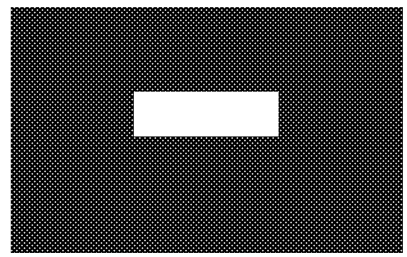
Figure 4C:
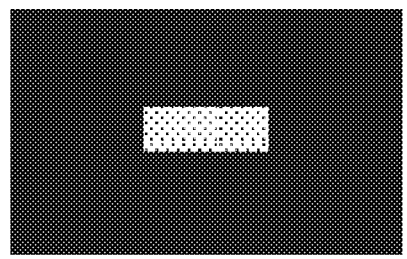
Figure 4D:
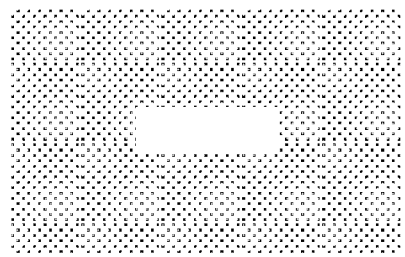

FIG. 4A shows a scene to shoot the high-brightness photographic subject, which illustrates an aspect of occurrence of the smear phenomenon in the horizontal direction of the high-brightness area. In the first place, each dark part in the horizontal direction of the high-brightness area is desirably not in the potential floated state as illustrated in FIG. 4B. Meanwhile, when the central part on the picture plane is not saturated as shown in FIG. 4C, the exposure may be corrected by the above-described exposure control such as a digital gain. However, if a certain smear component is contained therein, then the smear component may become visible as shown in FIG. 4A as a consequence of gain-up. If the smear phenomenon is likely to become visible due to the gain-up, then it is preferable to apply gain limit as described later in order to prevent occurrence of the phenomenon.

Figure 5:
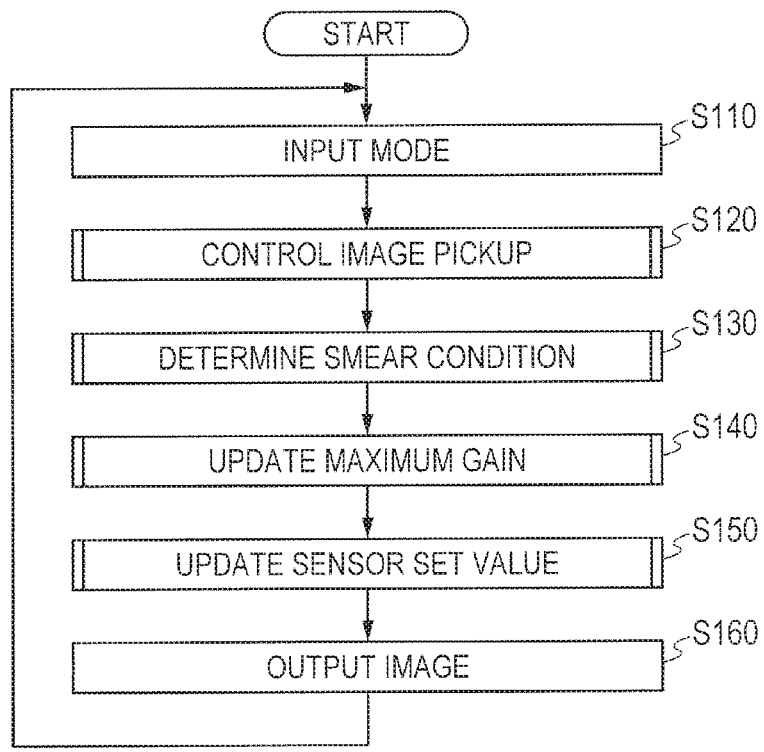
FIG. 5 is a flowchart of the first embodiment.

Now, details will be described below. FIG. 5 shows a flowchart of processing to be executed by the image pickup apparatus 100 according to the embodiment. When the image pickup apparatus 100 is powered on, the processing is executed sequentially from step S110 of FIG. 5.

In step S110 of FIG. 5, a shooting mode is set by the mode controller 105 on the basis of the setting of the parameter setter 300 of FIG. 1. The parameters to be set are set values including exposure parameters such as shutter, gain, stop, and the like. Here, automatic exposure settings may be applied to the exposure parameters so that the shutter, the gain, the stop, and the like may be automatically controlled to achieve optimum exposure. Moreover, a video format to be outputted from the output unit 106 may also be included as a parameter other than the exposure parameters. The video format includes 1080/60p, 1080/60i, and the like in the case of high definition. However, an arbitrary mode is applicable to the video mode in the present invention. The mode controller 105 passes information to the image pickup controller 102, the image processor 104, the output unit 106, and the lens controller 107 based on the parameters thus set. For example, the aforementioned shutter set value is passed to the image pickup controller 102. The aforementioned gain set value is passed to the image pickup controller 102 or the image processor 104 either as a set value for the corresponding column amplifier Amp in the image sensor 101 or as a digital gain set value. The output format set value is passed to the output unit 106. The stop set value is passed to the lens controller 107.

Figure 6:
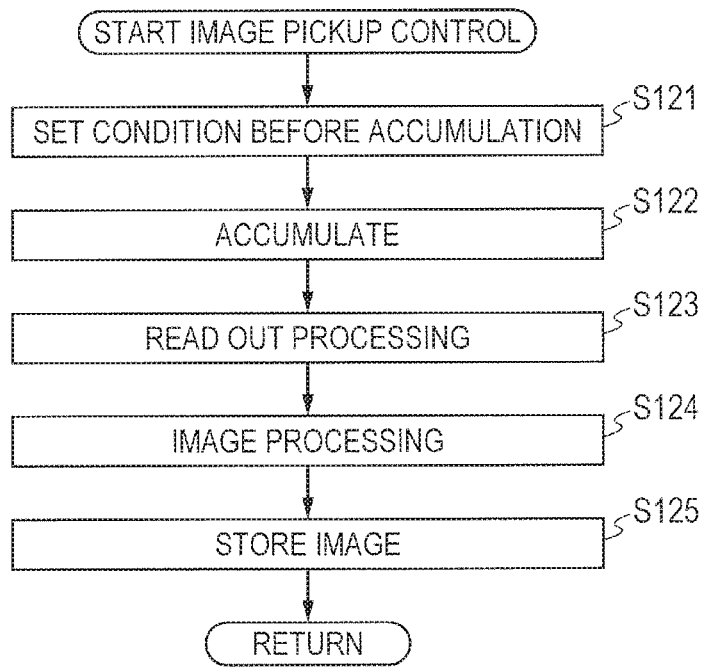
FIG. 6 is a subroutine in step S120 of the first embodiment.

Next, ordinary shooting takes place in step S120 of FIG. 5. FIG. 6 shows a shooting control subroutine in step S120.

Condition setting before accumulation is performed in step S121 of the shooting control subroutine. Here, as a pre-process of the image pickup processing in the ordinary shooting, the parameter settings that are set in step S110 of FIG. 5 are reflected. The image pickup controller 102 sets the shutter set value passed from the mode controller 105. Meanwhile, the lens controller 107 sets the stop set value passed from the mode controller 105. Here, the shutter set value to be set in step S121 may be set depending on the video format to be outputted by the output unit 106, or the shutter set value determined by the above-mentioned automatic exposure control may be set. The same applies to the stop set value.

After step S121 is executed, the subroutine proceeds to step S122 where the accumulation processing is carried out. In accordance with the shutter set value set in step S121, the image pickup controller 102 performs the accumulation processing for the image sensor 101. After the image sensor 101 is exposed for an accumulation period in accordance with the shutter set value, the subroutine proceeds to step S123.

In step S123, the image pickup signals accumulated in the image sensor 101 are read out by the image pickup controller 102. Then, the image pickup signals subjected to the AD conversion by the ADC 103 are inputted to the image processor 104. At this time, the image pickup signals after the exposure of the image sensor 101 are amplified by the column amplifiers Amp as described previously with reference to FIG. 3 and FIGS. 4A to 4D, and are outputted to the outside of the image sensor 101.

Next, in step S124, the image processing is performed by the image processor 104 in FIG. 1. Here, publicly known correction processing using optical black, flaw correction processing, and the like are carried out. Meanwhile, the image pickup signals read out in step S123 are amplified in accordance with the digital gain set value set in step S140 to be described later.

Next, in step S125, an image processed in step S124 is stored in a not-illustrated memory. Note that a concept of the image to be stored corresponds to any of FIGS. 4A to 4D described above.

Figure 7:
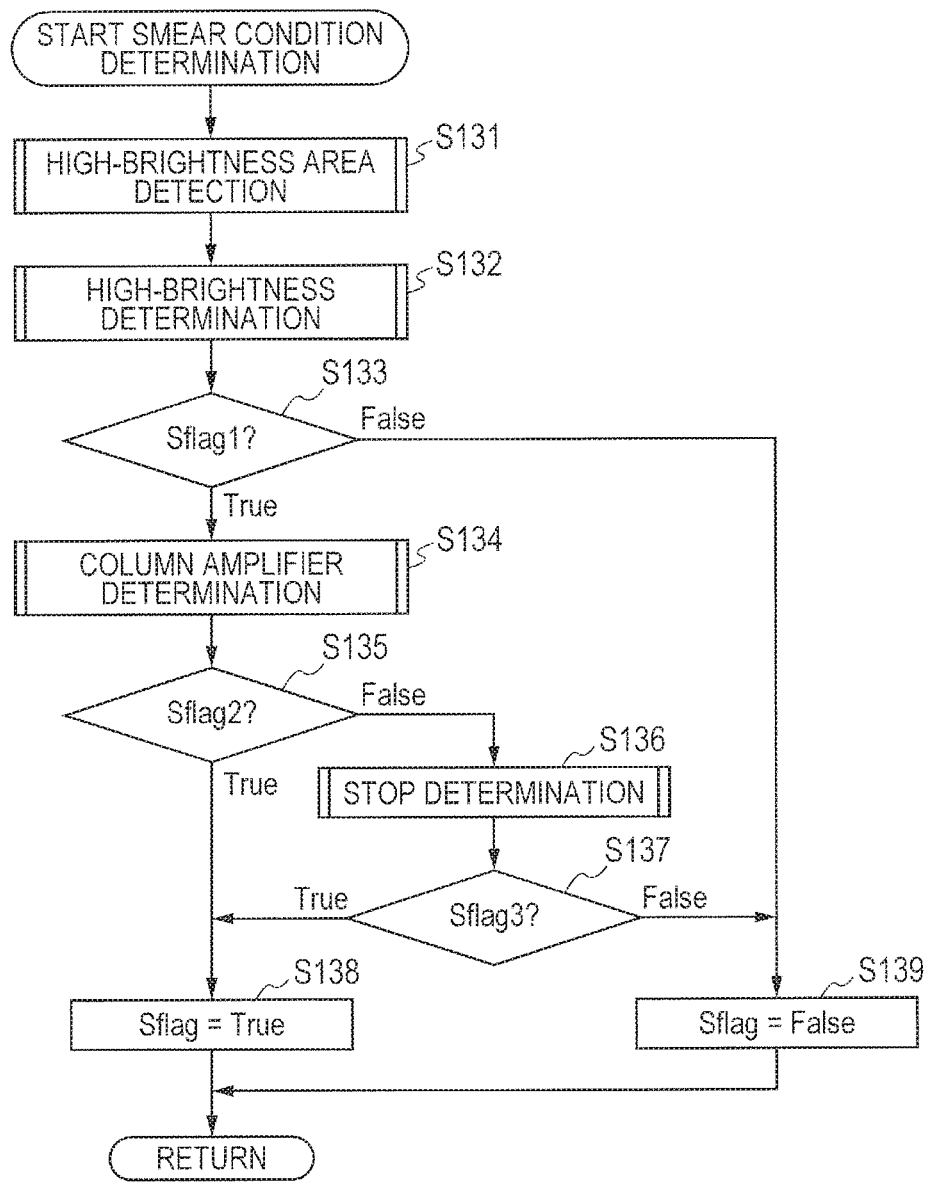
FIG. 7 is a subroutine in step S130 of the first embodiment.

After step S125 is executed, the subroutine shown in FIG. 6 is terminated and the processing proceeds to step S130. In step S130, the image processor 104 (a determiner) performs smear condition determination processing. FIG. 7 shows a smear condition determination subroutine in step S130.

In step S131, the image processor 104 (a brightness detector) performs high-brightness area detection processing from the picked up image signals. FIG. 8 shows a subroutine in step S131.

In step S1311, a variable px for storing the number of high-brightness pixels per line is set to 0, and a line reference counter variable lineNo is set to 1. In the following step S1312 to step S1316, presence of the smear region is determined by searching the total number of lines and determining whether or not there are the high-brightness pixels in the number equal to or greater than a predetermined number of pixels.

The subroutine proceeds to step S1313 when the determination in step S1312 turns out to be true, i.e., when the variable lineNo is equal to or smaller than the total number of lines.

In step S1313, the number of high-brightness pixels on each referred line indicated by the above-mentioned variable lineNo is counted, and the counted value is stored in a high-brightness count number Temp. Here, in order to count the number of pixels having the high-brightness, 90% of a saturation level is defined as a threshold, for example, and the number of brightness values equal to or greater than the threshold is counted. Note that this threshold may be an arbitrary value. The threshold may be set by measuring a level at which the smear begins to occur by means of an experiment and the like in advance, and burying the threshold defined on the basis of the measured value in a program and the like. After step S1313 is executed, the subroutine proceeds to step S1314.

In step S1314, the high-brightness count number Temp, on the line of the variable lineNo, calculated in step S1313 is compared with the variable px. The variable px is a variable for storing the maximum value of the high-brightness count number. The subroutine proceeds to step S1315 when the high-brightness count number Temp is greater than the variable px, i.e., when the comparison turns out to be true. The subroutine proceeds to step S1316 when the high-brightness count number Temp is equal to or smaller than the variable px in step S1314, i.e., when the comparison turns out to be false.

In step S1315, the maximum value of the high-brightness count number Temp is updated by assigning the value of the high-brightness count number Temp to the variable px. After step S1315 is executed, the subroutine proceeds to step S1316. In step S1316, the line currently being referred to is advanced by one line by incrementing the variable lineNo. After step S1316 is executed, the subroutine returns to step S1312.

The variable px is updated with the value of the high-brightness count number at each point in the course of execution of step S1312 to step S1316. As described above, when the high-brightness pixel numbers for all the lines are calculated and the maximum value of the high-brightness pixel number per line is obtained, the determination in step S1312 turns out to be false, and the subroutine of FIG. 8 is terminated.

High-brightness determination processing is carried out in step S132. FIG. 9 shows a subroutine in step S132. In step S1321, it is determined whether or not the variable px described with reference to FIG. 8 is greater than a threshold α. The threshold α may be an arbitrary value. Here, the subroutine proceeds to step S1322 when the variable px, namely, the high-brightness pixel number on the line having the largest high-brightness pixel number per line is greater than the threshold α, i.e., when the determination turns out to be true. The subroutine proceeds to step S1323 when the determination in step S1321 turns out to be false. In step S1322, a return value of the subroutine of FIG. 9 is set to be true. In step S1323, the return value is set to be false. After step S132 is executed, the processing proceeds to step S133.

In step S133, it is determined whether a flag Sflag1 set in the high-brightness determination processing is true or false (whether or not the high-brightness area is detected). The processing proceeds to step S134 in the case of being true (when there is the high-brightness area) or proceeds to step S139 in the case of being false (when there is not the high-brightness area).

Figure 10:
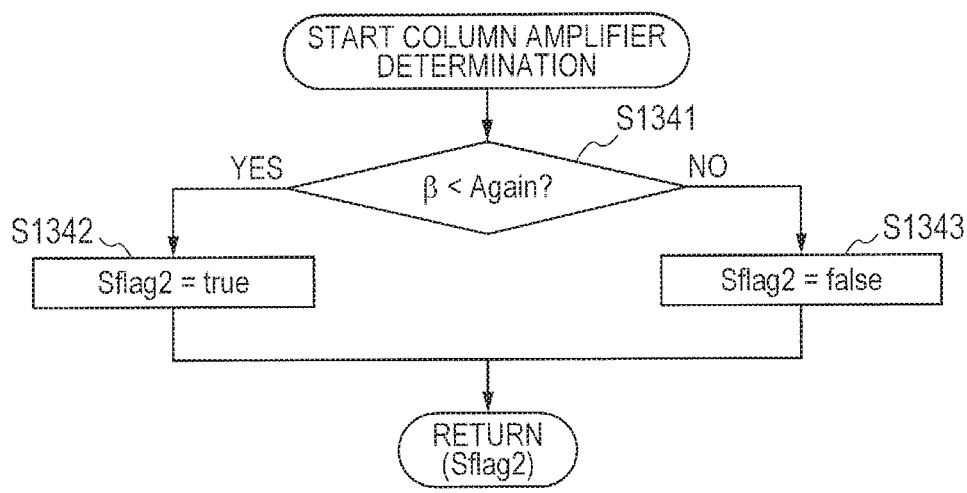
FIG. 10 is a subroutine in step S134 of the first embodiment.

Column amplifier determination processing is carried out in step S134. FIG. 10 shows a subroutine in step S134. In step S1341, it is determined whether or not a currently set column amplifier gain Again of the image sensor 101 is greater than a threshold β. The subroutine proceeds to step S1342 when the determination in step S1341 turns out to be true, i.e., when the column amplifier gain Again is greater than the threshold β. The subroutine proceeds to step S1343 when the determination in step S1341 turns out to be false, i.e., when the column amplifier gain Again is equal to or smaller than the threshold β. In step S1342, a return value of the subroutine of FIG. 10 is set to be true. In step S1343, the return value of the subroutine of FIG. 10 is set to be false. Note that the threshold β may be an arbitrary value. After the subroutine of FIG. 10 is terminated, the processing proceeds to step S135.

In step S135, it is determined whether a flag Sflag2 set in the column amplifier determination processing is true or false (whether the column amplifier gain is large or small as compared to the predetermined threshold). The processing proceeds to step S138 in the case of being true (when the column amplifier gain is large) or proceeds to step S136 in the case of being false (when the column amplifier gain is small).

Figure 11:
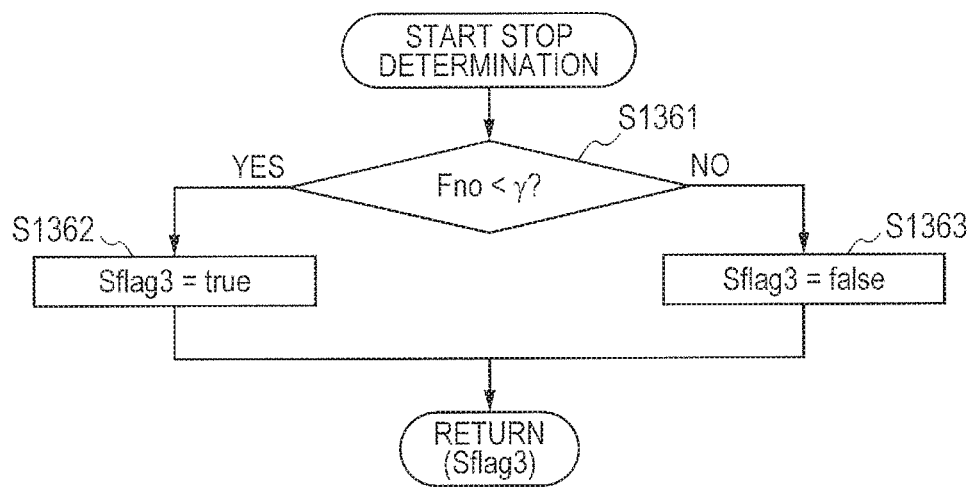
FIG. 11 is a subroutine in step S136 of the first embodiment.

Meanwhile, stop determination processing is carried out in step S136. FIG. 11 shows a subroutine in step S136. In step S1361, it is determined whether or not a stop value Fno acquired from the lens 200 through the not-illustrated communicator is smaller than a threshold γ. The subroutine proceeds to step S1362 when the determination in step S1361 turns out to be true, i.e., when the stop value Fno of the lens 200 is smaller than the threshold γ. The subroutine proceeds to step S1363 when the determination in step S1361 turns out to be false, i.e., when the stop value Fno of the lens 200 is equal to or greater than the threshold γ. After the subroutine of FIG. 11 is terminated, the processing proceeds to step S137.

In step S137, it is determined whether a flag Sflag3 set in the stop determination processing is true or false (whether the stop value, namely, the value Fno is large or small as compared to the predetermined threshold). The processing proceeds to step S138 in the case of being true (when Fno<γ) or proceeds to step S139 in the case of being false (when the Fno≥γ).

In step S138, a parameter Sflag for storing a result of determination of the smear condition is set to be true (representing a condition in which a smear is likely to occur), and the smear condition determination subroutine is terminated.

In step S139, the parameter Sflag for storing the result of determination of the smear condition is set to be false (representing a condition in which a smear does not occur), and the smear condition determination subroutine is terminated.

Figure 12:
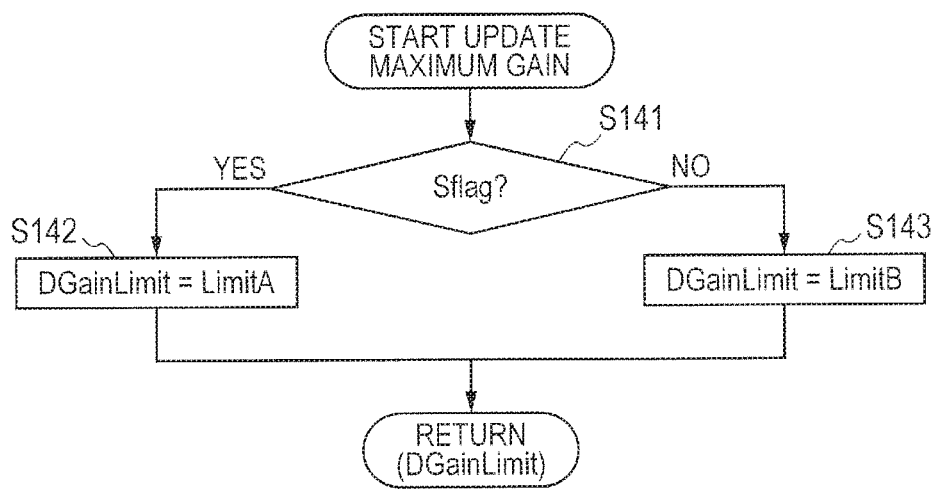
FIG. 12 is a subroutine in step S140 of the first embodiment.

Back to the description of the flowchart of FIG. 5, the image pickup controller 102 (a gain upper limit setter) updates a gain upper limit in step S140. FIG. 12 shows a subroutine in step S140. The parameter Sflag set in step S130 is referred to in step S141. The subroutine proceeds to step S142 when the parameter Sflag is true, i.e., when the smear condition is met. On the other hand, the subroutine proceeds to step S143 when the parameter Sflag is false in step S141, i.e., when the smear condition is not met. In step S142, a value LimitA is set to a variable DgainLimit. In step S143, a value LimitB is set to the variable DgainLimit. The subroutine of FIG. 12 is terminated after step S142 or step S143 is executed.

Note that the variable DgainLimit in FIG. 12 represents a settable gain upper limit. Here, the value LimitA is a smaller value than the value LimitB. When the smear condition is met, it is possible to determine that the smear is likely to occur. Accordingly, by setting the value LimitA which is a (small) gain upper limit, the various parameters are operated within ranges not causing the smear. On the other hand, when the smear condition is not met, it is possible to determine that the smear is unlikely to occur even if the gain is increased. Accordingly, it is possible to perform shooting with increased sensitivity by setting the gain upper limit to the value LimitB which is a (large) gain upper limit higher than the value LimitA.

Figure 13:
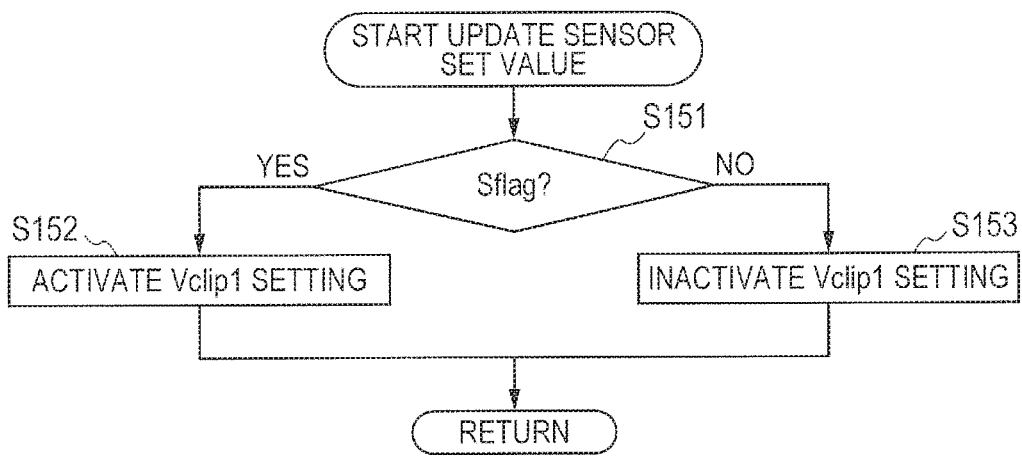
FIG. 13 is a subroutine in step S150 of the first embodiment.

After the subroutine of FIG. 12 is terminated, the processing proceeds to step S150 of FIG. 5. FIG. 13 shows a subroutine in step S150. In step S151, the parameter Sflag is determined as in step S141. The subroutine proceeds to step S152 when the parameter Sflag is true. The above-mentioned setting of the clip voltage Vclip1 is activated in step S152. When the setting of the clip voltage Vclip1 is activated, the clip enable signal ENclip1 shown in FIG. 3 is also turned ON. The subroutine proceeds to step S153 when the determination in step S151 turns out to be false. In contrast to step S152, the setting of the clip voltage Vclip1 is inactivated in step S153. As a consequence, the clip enable signal ENclip1 shown in FIG. 3 is turned OFF. In the case of the photographic subject which does not trigger the smear occurrence condition, it is thought to be unlikely to cause the saturation of the column amplifier as described previously. Particularly in the case of low illuminance and without the high-brightness photographic subject, it is thought to be unlikely to cause occurrence of the smear even if the digital gain is increased. After step S152 or step S153 is terminated, the subroutine of FIG. 13 is terminated and the processing proceeds to step S160 of FIG. 5.

In step S160 of FIG. 5, the image is outputted from the output unit 106 of FIG. 1. After step S160 is executed, the processing is executed again from Step S110.

As described above, in this embodiment, the shooting is carried out based on the inputted mode, and the determination is made as to whether or not the smear condition is met. Thus, it is possible to control the clip voltage depending on the shooting scene and to set the upper limit to the gain.

Shooting at night is an example of the shooting scenes described in this embodiment. The shooting at night is thought to involve frequent increases in gain in order to increase the sensitivity. Nonetheless, if the shooting control for dealing with the smear is conducted as in a conventional fashion, the gain will reach the upper limit even in an attempt to carry out high-sensitivity shooting, and it is not possible to increase the sensitivity higher than the upper limit. Meanwhile, the sensitivity can be improved more at night by cancelling the gain upper limit as described in this embodiment. Moreover, the previously suppressed saturation level will be cancelled by inactivating the clip voltage, whereby it is possible to achieve shooting in a wider dynamic range.

Second Embodiment

The first embodiment shows the example of suppressing occurrence of the smear by detecting the smear region out of the one-frame image obtained by the shooting, and activating the setting of the clip voltage and setting the gain upper limit when the smear condition is met. On the other hand, in the first embodiment, the setting of the clip voltage is inactivated and the gain upper limit is increased when the smear condition is not met, so that the high-sensitivity shooting can be carried out while expanding the dynamic range.

Meanwhile, this embodiment shows an example in which lines in a one-frame image on which a smear occurs and lines in the image on which the smear does not occur are distinguished from one another, and control of the clip voltage is switched depending on the line. Regarding the lines on which the smear does not occur, the clip voltage is inactivated so that a dynamic range at a dark part is further expanded.

Figure 14:
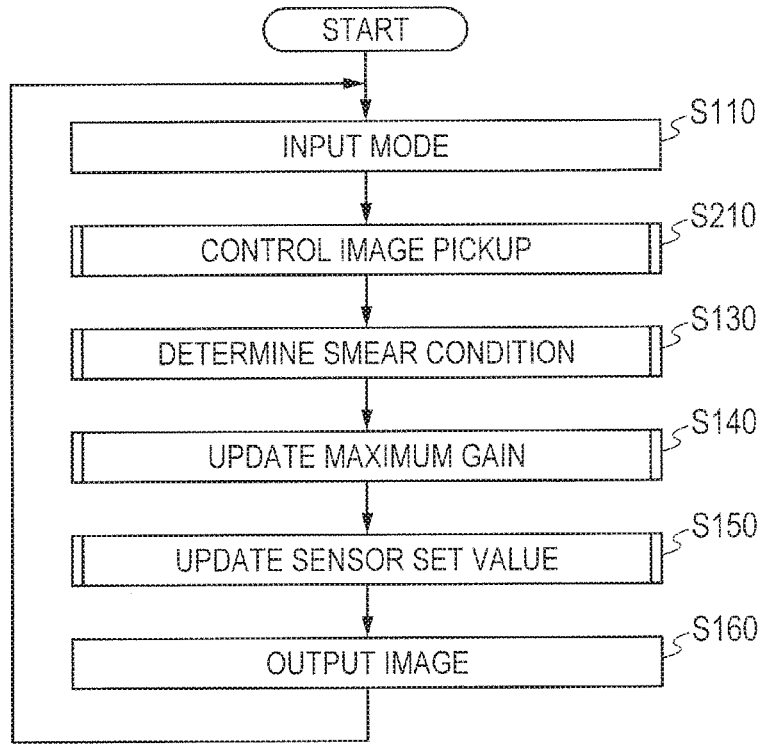
FIG. 14 is a flowchart of a second embodiment.

A configuration of an image pickup apparatus of this embodiment is the same as that of the first embodiment, and a description of the configuration will therefore be omitted. FIG. 14 shows a flowchart of processing to be executed by the image pickup apparatus 100 in this embodiment. When the image pickup apparatus 100 is powered on, the processing is executed sequentially from step S110 of FIG. 14.

In step S110, the shooting mode is set as in the first embodiment on the basis of the setting of the parameter setter 300 of FIG. 1. After step S110 is executed, the processing proceeds to step S210.

Figure 15:
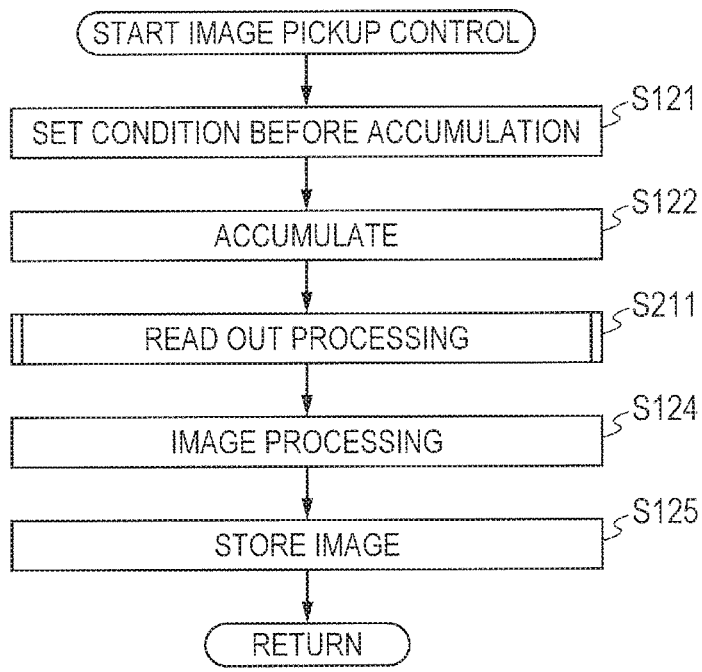
FIG. 15 is a subroutine in step S210 of the second embodiment.

Shooting control is carried out in step S210. FIG. 15 shows a subroutine in step S210. In step S121 and step S122, condition setting before accumulation and accumulation processing are performed as in steps S121 and S122 of FIG. 6. After step S122 is executed, the subroutine proceeds to step S211 where read out processing takes place.

Figure 16:
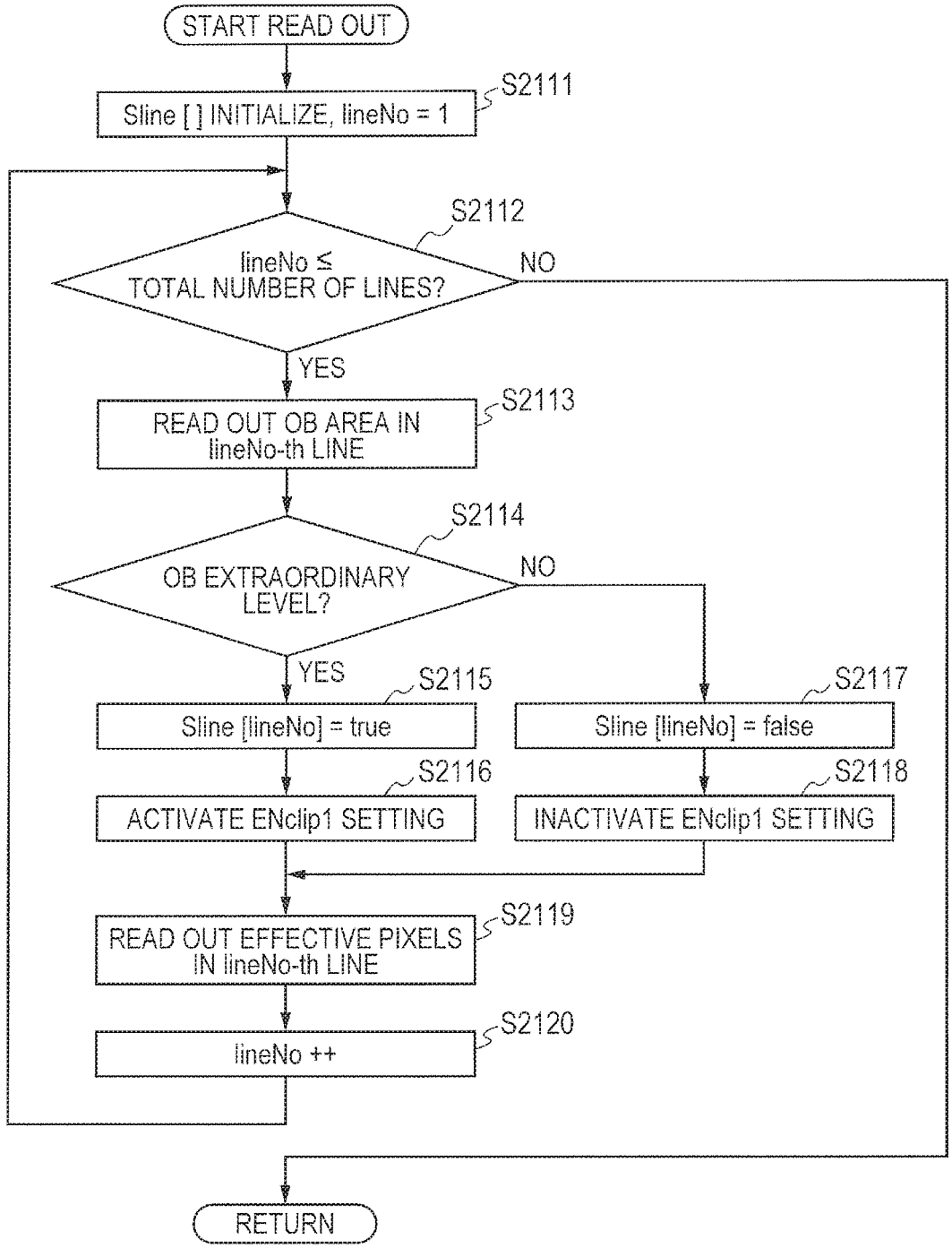
FIG. 16 is a subroutine in step S211 of the second embodiment.

FIG. 16 shows a subroutine of the read out processing in step S211 of FIG. 15. First, in step S2111, an array Sline is initialized and the variable lineNo is initialized to 1 as in the first embodiment. The array Sline is a parameter array for storing flags each indicating occurrence of the smear on the corresponding line. Here, the number of elements in the array Sline is equal to the total number of lines of the image sensor 101 because the occurrence of the smear is determined on the line basis. After step S2111 is executed, the subroutine proceeds to step S2112.

In step S2112, it is determined whether or not the variable lineNo is equal to or smaller than the total number of lines. The subroutine proceeds to step S2113 when the determination in step S2112 turns out to be true, i.e., when the variable lineNo is equal to or smaller than the total number of lines. The read out processing subroutine of FIG. 16 is terminated when the determination turns out to be false, i.e., when the variable lineNo is greater than the total number of lines.

In step S2113, the image pickup signals on each referred line indicated by the variable lineNo are read out. In this case, the image signals in a not-illustrated image sensor OB region (optical black region) are read out. The OB region is publicly known and the description thereof will be omitted. After step S2113 is executed, the subroutine proceeds to step S2114.

In step S2114, it is determined whether or not a level of (brightness information on) the OB region read out in step S2113 is extraordinary or ordinary. The subroutine proceeds to step S2115 when the determination in step S2113 turns out to be true, i.e., when the level of the OB region is extraordinary. The subroutine proceeds to step S2117 when the determination turns out to be false, i.e., when the level of the OB region is ordinary.

The OB region of the image sensor 101 is usually a light-shielded region, and generally has a value equal to or smaller than a certain value. On the other hand, if the smear occurs on the same line, an image pickup signal level has a value equal to or greater than a prescribed value even at the time of reading out the OB region as described previously. In other words, if the determination in step S2114 turns out to be true, then it is possible to determine that the smear is occurring on the same line.

Back to the description of FIG. 16, in step S2115, a value true indicating the occurrence of the smear is assigned to a storage place of an index indicated by the variable lineNo of the array Sline. After step S2115 is executed, the subroutine proceeds to step S2116. In step S2116, the clip enable signal ENclip1 is activated in order to activate the clip voltage Vclip1. The smear phenomenon can be reduced by activating the clip voltage Vclip1.

In step S2117, a value false indicating the non-occurrence of the smear is assigned to the storage place of the index indicated by the variable lineNo of the array Sline. After step S2117 is executed, the subroutine proceeds to step S2118. In contrast to step S2116, the clip enable signal ENclip1 is inactivated in step S2118. The clip voltage Vclip1 is inactivated on the line where it is possible to determine that the smear does not occur. Thus, the dynamic range of the image pickup signal can be expanded on that line.

After step S2116 or step S2118 is executed, the subroutine proceeds to step S2119. In step S2119, the image pickup signals on each referred line indicated by the variable lineNo refers to are read out. While the signals in only the OB region are read out in step S2113, the signals in a region including the remaining effective pixels are read out in step S2119.

After the step S2119 is executed, the subroutine proceeds to step S2120. In step S2120, the variable lineNo is incremented and then the subroutine returns to step S2111. Thereafter, the read out processing is carried out until the variable lineNo exceeds the total number of lines, i.e., until completion to read out the signals on all the lines of the image sensor 101.

After the read out processing subroutine of FIG. 16 is executed, the subroutine proceeds to step S124 of FIG. 15. In steps S124 and S125, the image processing is carried out as in the first embodiment, and the image is stored in the not-illustrated memory. After step S125 of FIG. 15 is executed, the subroutine of FIG. 15 is terminated and the processing proceeds to step S130 of FIG. 14.

The processing carried out in the step S130 to step S160 of FIG. 14 is the same as the processing of the first embodiment, and the description thereof will be omitted.

As described above, in the second embodiment, the extraordinary level of the OB region is detected on the line basis in the read out processing of the image sensor 101, thereby detecting whether or not the smear is occurring on the corresponding line. Moreover, if it is determined that there is the smear on a line targeted for the read out, then it is possible to implement a countermeasure for reducing the smear by using the clip voltage on the line basis. In other words, it is possible to distinguish the lines on which the smear is present from the lines on which the smear is not present, thereby providing only the lines, on which the smear is occurring, with the countermeasure while securing the dynamic range for the lines on which the smear is not present.

For example, the high-brightness area detection is carried out in step S132 of FIG. 7 of the first embodiment. In the meantime, as shown in step S211 of FIG. of the second embodiment, the high-brightness area detection may be carried out at the time of reading the signals out of the image sensor 101.

Meanwhile, in the present invention, the output format from the output unit 106 of FIG. 1 is not limited to HD-SDI or HDMI (registered trademark). The present invention can also be embodied by using various other output formats. Meanwhile, there is a device called an AFE formed by incorporating a timing generator into the ADC 103. Hence, the ADC 103 may be replaced by such an AFE.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-141305, filed Jul. 15, 2015, which is hereby incorporated by reference herein in its entirety.

What is claimed is:

1. An image pickup apparatus that outputs an image signal based on an optical signal photoelectrically converted by an image sensor provided with a plurality of two-dimensionally arranged pixels, the image pickup apparatus comprising:
   at least one processor configured to execute:
      a clip limiting function that controls the image sensor to limit an output voltage of the image signal based on the optical signal;
      a gain upper limit setting function that controls the image sensor to set a gain upper limit to be applied to the image signal;
      a condition determining function that determines whether or not a condition to cause occurrence of a smear in a shot image is satisfied based on a gain that is set to be applied to the image signal; and
      a smear control function that:
         activates the clip limiting function to limit the output voltage of the image signal when the condition determining function determines that the condition to cause occurrence of the smear is satisfied; and
         deactivates the clip limiting function when the condition determining function determines that the condition to cause occurrence of the smear is not satisfied.

2. The image pickup apparatus according to claim 1, wherein:
   the smear control function activates the gain upper limit set by the gain upper limit setting function when the condition determining function determines that there is the condition to cause occurrence of the smear, and
   the smear control function deactivates the gain upper limit set by the gain upper limit setting function when the condition determining function determines that the condition to cause occurrence of the smear is not satisfied.

3. The image pickup apparatus according to claim 1, wherein:
   the at least one processor is further configured to execute a brightness detecting function that detects brightness of each of the plurality of pixels based on the optical signal, and
   the condition determining function determines the condition to cause occurrence of the smear also based on the brightness detected by the brightness detecting function.

4. An image pickup apparatus that outputs an image signal based on an optical signal photoelectrically converted by an image sensor provided with a plurality of two-dimensionally arranged pixels, the image pickup apparatus comprising:
   at least one processor configured to execute:
      a clip limiting function that controls the image sensor to limit an output voltage of the image signal based on the optical signal;
      a gain upper limit setting function that controls the image pickup sensor to set a gain upper limit to be applied to the image signal;
      a condition determining function that determines whether or not a condition to cause occurrence of a smear in a shot image is satisfied based on a stop value acquired from a lens having a stop mechanism; and
      a smear control function that:
         activates the clip limiting function to limit the output voltage of the image signal when the condition determining function determines that the condition to cause occurrence of the smear is satisfied; and
         deactivates the clip limiting function when the condition determining function determines that the condition to cause occurrence of the smear is not satisfied.

5. An image pickup apparatus that outputs an image signal based on an optical signal photoelectrically converted by an image sensor provided with a plurality of two-dimensionally arranged pixels, the image pickup apparatus comprising:
   at least one processor configured to execute:
      a clip limiting function that controls the image sensor to limit an output voltage of the image signal based on the optical signal;
      a gain upper limit setting function that controls the image pickup sensor to set a gain upper limit to be applied to the image signal;

a brightness detecting function that detects brightness of each of the plurality of pixels based on the image signal;

a condition determining function that determines whether or not a condition to cause occurrence of a smear in a shot image is satisfied based on a number of high-brightness pixels per line in the image signal detected by the brightness detecting function; and a smear control function that:

activates the clip limiting function to limit the output voltage of the image signal when the condition determining function determines that the condition to cause occurrence of the smear is satisfied; and deactivates the clip limiting function when the condition determining function determines that the condition to cause occurrence of the smear is not satisfied.

6. The image pickup apparatus according to claim 5, wherein the smear control function activates the clip limiting function to limit the output voltage of the image signal when the image signal is read out of a line determined by the condition determining function as being a line satisfying the condition to cause occurrence of the smear.

7. The image pickup apparatus according to claim 5, wherein:

the brightness detecting function detects brightness information on an optical black region of the image sensor, and the condition determining function determines whether or not the condition to cause occurrence the smear is satisfied also based on brightness information on the optical black region.

8. The image pickup apparatus according to claim 4, wherein:

the smear control function activates the gain upper limit set by the gain upper limit setting function when the condition determining function determines that there is the condition to cause occurrence of the smear, and the smear control function deactivates the gain upper limit set by the gain upper limit setting function when the condition determining function determines that the condition to cause occurrence of the smear is not satisfied.

9. The image pickup apparatus according to claim 4, wherein:

the at least one processor is further configured to execute a brightness detecting function that detects brightness of each of the plurality of pixels based on the optical signal, and the condition determining function determines the condition to cause occurrence of the smear also based on the brightness detected by the brightness detecting function.

* * * * *